(12) United States Patent
Liebler et al.

(10) Patent No.: US 9,953,730 B2
(45) Date of Patent: Apr. 24, 2018

(54) STRIP FOR A NUCLEAR FUEL ASSEMBLY SPACER GRID

(75) Inventors: Michael Liebler, Heilsbronn (DE);
Bernd Dressel, Erlangen (DE); Kevin Elliott, Benton City, WA (US); William D. Bishop, West Richland, WA (US); Jeffrey C. Morris, Kennewick, WA (US)

(73) Assignee: AREVA NP, Courbevoie (FR)

( * ) Notice: Subject to any disclaimer, the term of this patent is extended or adjusted under 35 U.S.C. 154(b) by 365 days.

(21) Appl. No.: 13/822,510

(22) PCT Filed: May 18, 2012

(86) PCT No.: PCT/EP2012/059306
§ 371 (c)(1),
(2), (4) Date: Jun. 5, 2013

(87) PCT Pub. No.: WO2012/160003
PCT Pub. Date: Nov. 29, 2012

(65) Prior Publication Data
US 2014/0056398 A1 Feb. 27, 2014

(30) Foreign Application Priority Data
May 20, 2011 (EP) .................................... 11305628

(51) Int. Cl.
*G21C 3/34* (2006.01)
*G21C 3/356* (2006.01)
(Continued)

(52) U.S. Cl.
CPC ........... *G21C 3/3563* (2013.01); *G21C 3/352* (2013.01); *G21C 3/322* (2013.01); *Y02E 30/40* (2013.01)

(58) Field of Classification Search
CPC ...... G21C 3/34; G21C 3/3408; G21C 3/3416; G21C 3/348; G21C 3/352; G21C 3/356; G21C 3/3563
See application file for complete search history.

(56) References Cited

U.S. PATENT DOCUMENTS 3,844,887 A * 10/1974 Georges ................. G21C 3/348
165/162
4,058,436 A 11/1977 Anthony
(Continued)

FOREIGN PATENT DOCUMENTS

CN 86102224 A 11/1986
CN 1189236 A 7/1998
(Continued)

OTHER PUBLICATIONS

International Search Report for corresponding International Application PCT/EP2012/059306.

*Primary Examiner* — Marshall P O'Connor
(74) *Attorney, Agent, or Firm* — Davidson, Davidson & Kappel, LLC (57) ABSTRACT

The strip is of the type comprising a wall portion for delimiting a cell with interlaced strips, a spring formed in the strip and provided on the wall portion for biasing a fuel rod extending through the cell away from the wall portion, the spring comprising a cantilevered tab formed in the strip and a contact portion formed at least partially in the tab and protruding from the tab for contacting a fuel rod received in the cell.

29 Claims, 9 Drawing Sheets

(51) Int. Cl.
*G21C 3/352* (2006.01)
*G21C 3/322* (2006.01)

(56) References Cited

U.S. PATENT DOCUMENTS

| | | | |
|---|---|---|---|
| 4,163,690 A | 8/1979 | Jabsen | |
| 4,396,573 A | 8/1983 | Feutrel | |
| 4,702,881 A | 10/1987 | Weiland et al. | |
| 4,818,479 A | 4/1989 | Christiansen et al. | |
| 4,879,090 A * | 11/1989 | Perrotti | G21C 3/322 |
| | | | 376/439 |
| 4,933,138 A | 6/1990 | Mouesca et al. | |
| 4,957,697 A | 9/1990 | Wada | |
| 5,180,548 A | 1/1993 | Verdier | |
| 5,263,071 A * | 11/1993 | Farkas | G21C 3/344 |
| | | | 376/438 |
| 5,331,678 A | 7/1994 | Hatfield et al. | |
| 5,966,419 A | 10/1999 | Petit | |
| 6,278,759 B1 | 8/2001 | Yoon et al. | |
| 6,526,116 B1 | 2/2003 | Nguyen et al. | |
| 2003/0012329 A1 | 1/2003 | Yoon et al. | |
| 2003/0215048 A1 | 11/2003 | Broders et al. | |
| 2003/0215049 A1 | 11/2003 | Mayet et al. | |
| 2007/0242793 A1 | 10/2007 | Song et al. | |
| 2009/0296876 A1 | 12/2009 | De Villereglan et al. | |
| 2014/0072091 A1 | 3/2014 | Liebler et al. | |

FOREIGN PATENT DOCUMENTS

| | | | | |
|---|---|---|---|---|
| CN | 1231053 A | 10/1999 | | |
| CN | 1261975 A | 8/2000 | | |
| CN | 1458653 A | 11/2003 | | |
| CN | 101055775 A | 10/2007 | | |
| CN | 101589438 A | 11/2009 | | |
| GB | 2 181 292 A | 4/1987 | | |
| JP | A55-004533 | 1/1980 | | |
| JP | U61-108997 | 7/1986 | | |
| JP | U61108997 | 7/1986 | | |
| JP | A62-083687 | 4/1987 | | |
| JP | S62-148891 A | 7/1987 | | |
| JP | A64-072095 | 3/1989 | | |
| JP | H01-173898 A | 7/1989 | | |
| JP | H01-242992 A | 9/1989 | | |
| JP | S64-065491 | 10/1989 | | |
| JP | 02-021597 | * | 2/1990 | G21C 3/34 |
| JP | U02-021597 | 2/1990 | | |
| JP | U02021597 | 2/1990 | | |
| JP | H02-257092 | 10/1990 | | |
| JP | A04-329394 | 11/1992 | | |

* cited by examiner

STRIP FOR A NUCLEAR FUEL ASSEMBLY SPACER GRID

The present invention relates to a strip for a nuclear fuel assembly spacer grid comprising interlaced strips defining a lattice of cells for receiving fuel rods and allowing flow of a coolant in a flow direction.

BACKGROUND

U.S. Pat. No. 4,879,090 illustrates on FIG. 5 thereof a peripheral strip for a nuclear fuel assembly spacer grid, the peripheral strip comprising wall portions to delimit cells and on each wall portion a spring formed by a tab cut out in the strip and motion limiters formed as a pair of bosses embossed in the strip at a distance from the tab.

In operation, a coolant fluid (e.g. water) flows axially upwardly through the cells of the spacer grid. The spring and the motion limiters provided on each wall portion protrude from the plane of the wall portion towards the center of the same cell delimited by the wall portion and partially obstruct the coolant fluid flow channel.

SUMMARY OF THE INVENTION

An object of the invention is to provide a strip for a nuclear fuel assembly spacer grid limiting the flow resistance of the spacer grid whilst allowing suitable support for the nuclear fuel rods during the whole fuel assembly lifetime and good manufacturability.

To this end, the a strip for a nuclear fuel assembly spacer grid for a nuclear fuel assembly spacer grid is provided comprising interlaced strips defining a lattice of cells for receiving fuel rods and allowing flow of a coolant in a flow direction, the strip being of the type comprising a wall portion for delimiting a cell, a spring formed in the strip and provided on the wall portion for biasing the fuel rod extending through the cell away from the wall portion, the spring comprising a cantilevered tab formed in the strip and a contact portion formed at least partially in the tab and protruding from the tab for contacting the fuel rod received in the cell.

In other embodiments, the strip comprises one or several of the following features, taken in isolation or in any technically feasible combination:
   in a free state of the spring, the tab is inclined relative to the wall portion;
   the contact portion is formed exclusively in the tab;
   the contact portion is formed in the tab and in the wall portion, the contact portion stepping over a connection line between the tab and the wall portion;
   the contact portion is in the form of an arched bridge;
   the contact portion has an end connected to the tab and an end connected to the wall portion;
   the contact portion is a bulge formed in the tab;
   the contact portion is of elliptical perimeter;
   the contact portion is elongated in the flow direction;
   the tab extends downwardly in cantilevered fashion towards an upstream lower edge of the strip;
   the tab is delimited by an elongated curved slot and a connection line joining the two opposite ends of the slot;
   ends of the slot are circular and enlarged;
   the slot is U-shaped with branches diverging one from the other;
   a motion limiter formed in the strip on the wall portion to limit motion of the fuel rod received in the cell towards the wall portion against action of the spring;
   the motion limiter is provided upstream or downstream the spring in the coolant flow direction through the cell delimited by the wall portion;
   the motion limiter is a bulge formed in the wall portion;
   the motion limiter is elongated, namely of elliptical perimeter.

A spacer grid is also provided comprising interlaced strips defining a lattice of cells for receiving fuel rods and allowing flow of a coolant axially upwardly through the spacer grid, at least one of the interlaced strips being a strip as defined above.

A nuclear fuel assembly is provided comprising a bundle of fuel rods and an armature for supporting the fuel rods, the armature comprising at least one spacer grid as defined above.

BRIEF SUMMARY OF THE DRAWINGS

The invention and its advantages will be better understood on reading the following description given solely by way of example and with reference to the appended drawings, in which.

DETAILED DESCRIPTION

Figure 1:
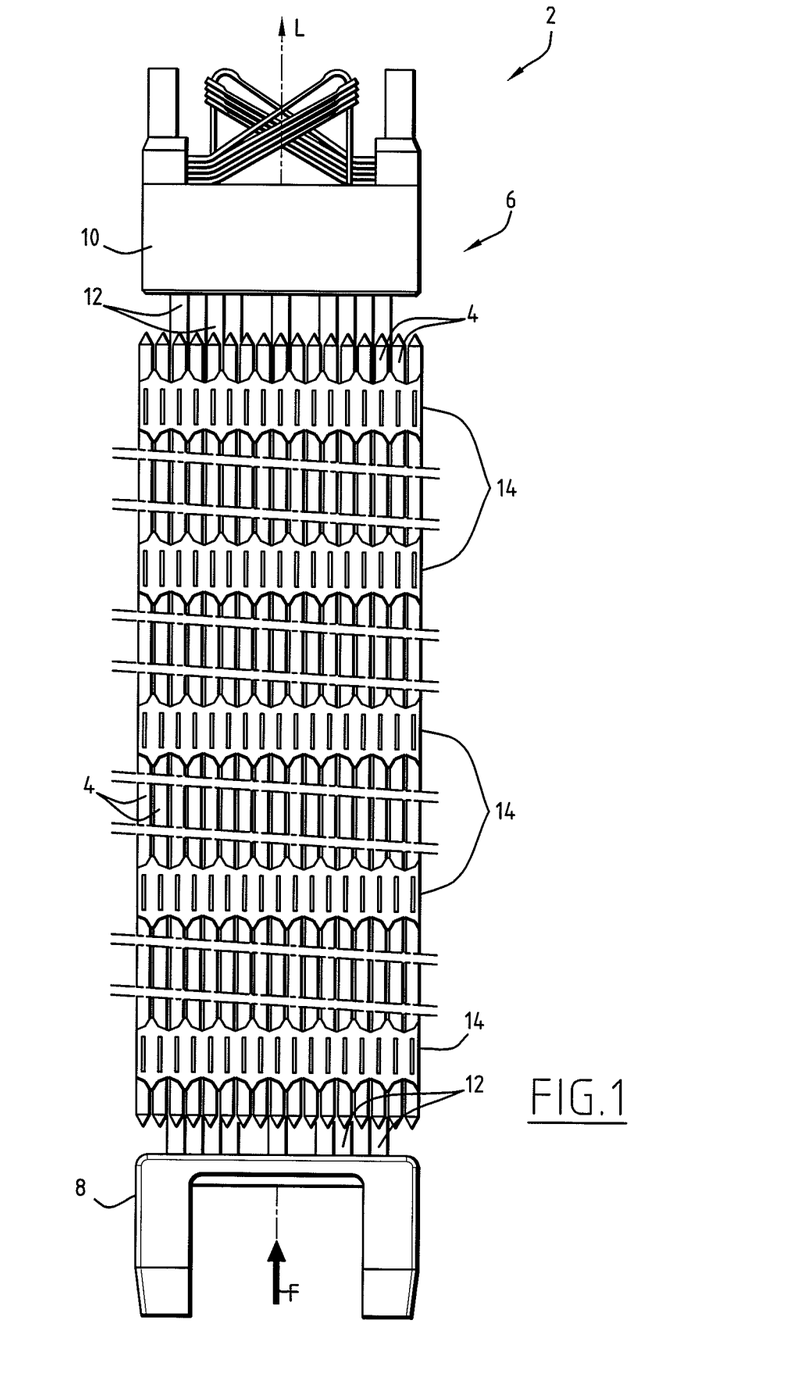
FIG. 1 is a side elevation view of a pressurized water reactor nuclear fuel assembly having spacer grids made of interlaced strips.

The nuclear fuel assembly 2 for a pressurized water reactor (PWR) illustrated on FIG. 1 comprises a bundle of nuclear fuel rods 4 and an armature 6 for supporting the fuel rods 4. The PWR fuel assembly 2 is elongated along an assembly axis L extending vertically when the fuel assembly 2 is disposed inside a nuclear reactor.

The armature 6 comprises a lower nozzle 8, an upper nozzle 10, a plurality of guide-tubes 12 and a plurality of spacer grids 14.

The guide-tubes 12 extend parallel to assembly axis L and connect the lower nozzle 8 to the upper nozzle 10 and maintain a predetermined spacing along assembly axis L between the nozzles 8, 10. Each guide-tube 12 opens upwards through the upper nozzle 10 for allowing insertion of a control rod into the guide-tube 12.

Figure 2:
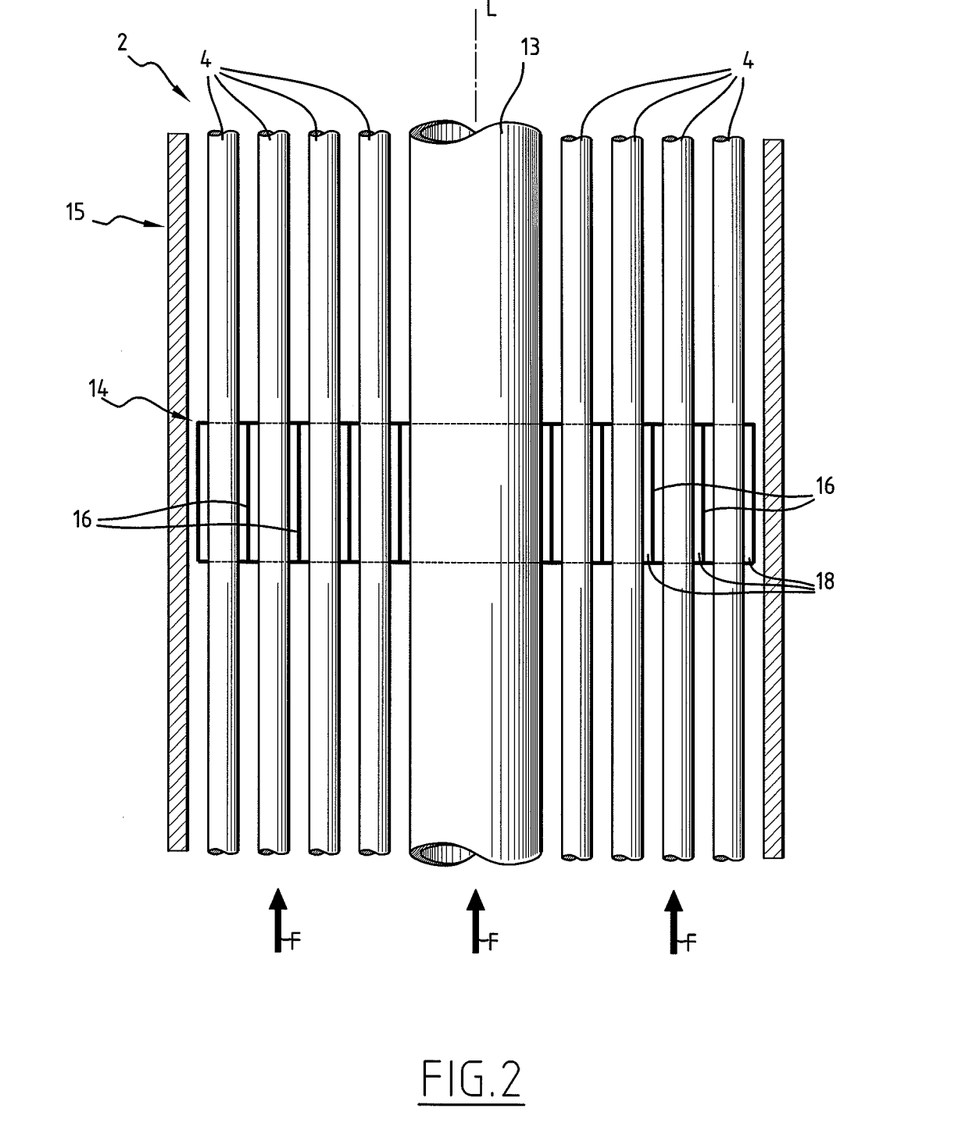
FIG. 2 is a partial sectional side view of a boiling water reactor nuclear fuel assembly having spacer grids made of interlaced strips.

The nuclear fuel assembly 2 for a boiling water reactor (BWR) illustrated on FIG. 2 is also elongated along an assembly axis L extending vertically when the fuel assembly 2 is disposed inside a nuclear reactor.

The BWR fuel assembly 2 comprises a bundle of nuclear fuel rods 4, an armature for maintaining the fuel rods 4 and a tubular fuel channel 15 surrounding the bundle of fuel rods 4. The armature typically comprises a lower nozzle and an upper nozzle spaced along assembly axis L, at least one water channel 13 arranged within the bundle of fuel rods 4 and a plurality of spacer grids 14 distributed along the bundle of fuel rods 4.

The fuel rods 4, the water channel 13 and the fuel channel 15 extend between the lower nozzle and the upper nozzle, with the water channel 13 and the fuel channel 15 connecting the lower nozzle and the upper nozzle.

The water channel 13 extends parallel to the fuel rods 4. The water channel 13 is arranged for channeling a coolant/moderator flow separately from the bundle of fuel rods 4.

The fuel channel 15 extends parallel to the fuel rods 4. The fuel channel 15 encases the bundle of fuel rods 4 and the water channel 13. The fuel channel 15 is arranged for channeling a coolant/moderator flow between and about the fuel rods 4.

The PWR and BWR spacer grids 14 are distributed in spaced relationship along the fuel rods 4.

Each spacer grid 14 extends transversely to the assembly axis L.

Each fuel rod 4 comprises a tubular cladding, pellets of nuclear fuel stacked inside the cladding and caps closing the ends of the cladding. Each fuel rod 4 extends parallel to assembly axis L through the spacer grids 14 with being supported transversely and longitudinally relative to assembly axis L by the spacer grids 14.

In operation, the fuel assembly 2 is placed in a nuclear reactor with the lower nozzle 8 resting on a bottom plate of the reactor and the assembly axis L being substantially vertical. A coolant flows upwardly along the fuel assembly 2 with flowing between the fuel rods 4 and through the nozzles 8, 10 and the spacer grids 14 as illustrated by arrows F on FIGS. 1 and 2.

The spacer grids 14 may be similar to each other and one spacer grid 14 according to the invention will be further described with reference to FIGS. 3-7.

Figure 3:
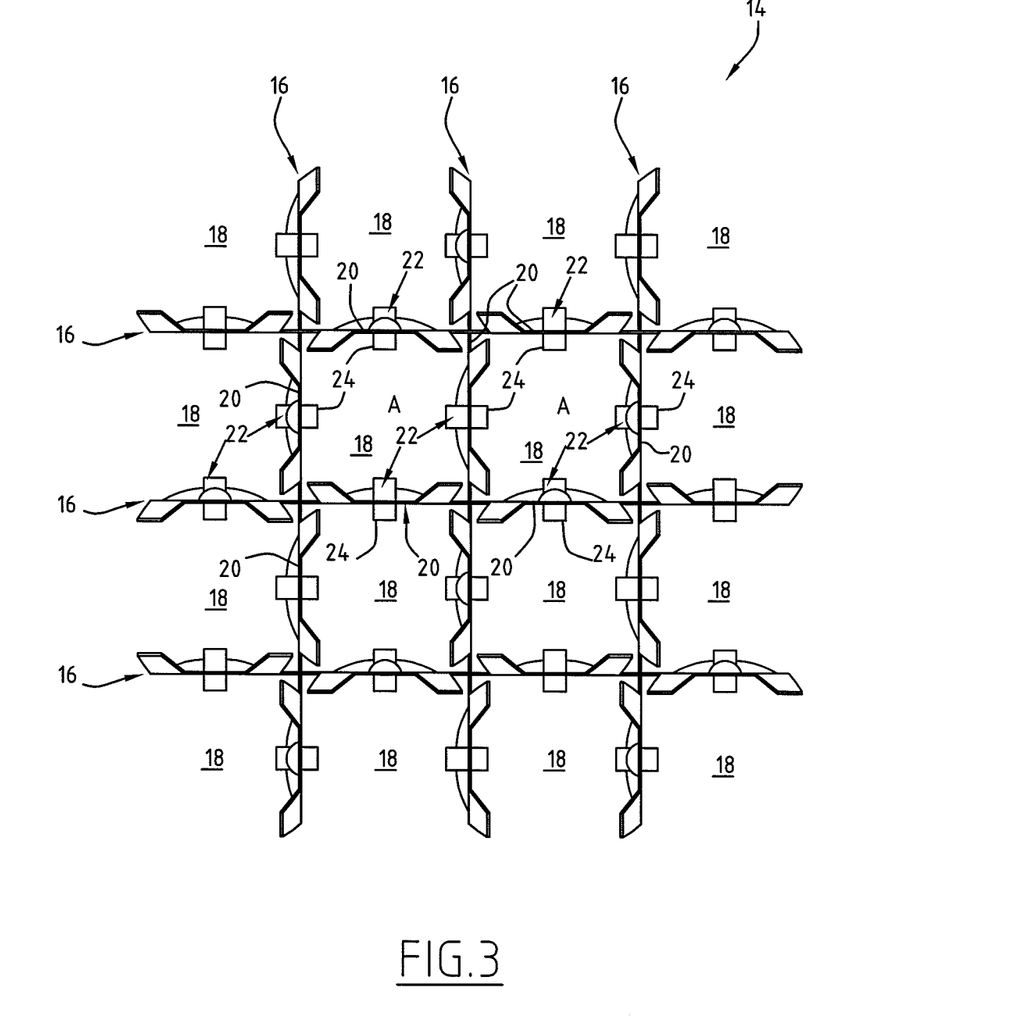
FIG. 3 is a partial top view of a spacer grid according to the invention.

As illustrated on FIG. 3, the spacer grid 14 comprises a plurality of interlaced metallic strips 16 defining a lattice of cells 18 each for receiving one fuel rod 4, only a few cells 18 being illustrated on FIG. 3.

In a known manner, in the case of a spacer grid for a PWR fuel assembly, the interlaced strips 16 also define a plurality of cells for receiving PWR guide-tubes 12, the spacer grid 14 being secured to the guide-tubes 12, e.g. by welding. Similarly, in the case of a spacer grid for a BWR fuel assembly, the at least one BWR water channel 13 typically replaces one or several fuel rods 4 in the lattice, the interlaced strips define an aperture for receiving the water channel 13 and the spacer grid 14 is secured to the water channel 13, e.g. by welding.

Only cells 18 for receiving fuel rods 4 are illustrated on FIG. 3 and in the following, the term "cell" refer to the cells 18 for receiving fuel rods 4.

Each cell 18 is tubular and extends along a cell axis A. The cell axis A is to be parallel to the assembly axis L (perpendicular to FIG. 3) when the spacer grid 14 is assembled in the fuel assembly 2 (FIGS. 1 and 2). The cell axes A of the different cells 18 are parallel. Each cell 18 is delimited by four wall portions 20 of two pairs of intersecting strips 16, the strips 16 of each pair extending parallel to one another.

One wall portion 20 of each pair of opposite wall portions 20 delimiting a cell 18 has an elastic spring 22 formed in the wall portion 20 and protruding in a free state towards the center of the cell 18, and the other wall portion 20 of each pair of opposite wall portions 20 has a rigid dimple 24 formed in the wall portion 20 and protruding towards the center of the cell 18.

The springs 22 and dimples 24 provided on the wall portions 20 of each cell 18 are arranged such that a fuel rod 4 extending through the cell 18 is biased transversely by the springs 22 against the dimples 24 to support the fuel rod 4 transversely and longitudinally relative to the cell axis A.

Each wall portion 20 delimiting two adjacent cells 18 (one on each side of the strip 16) has a spring 22 protruding on a face of the wall portion 20 in one of the cells 18 and a dimple 24 protruding on the opposite face of the wall portion 20 in the other cell 18. Each wall portion 20 delimiting only one cell 18 has either a spring 22 or a dimple 24.

Figure 4:
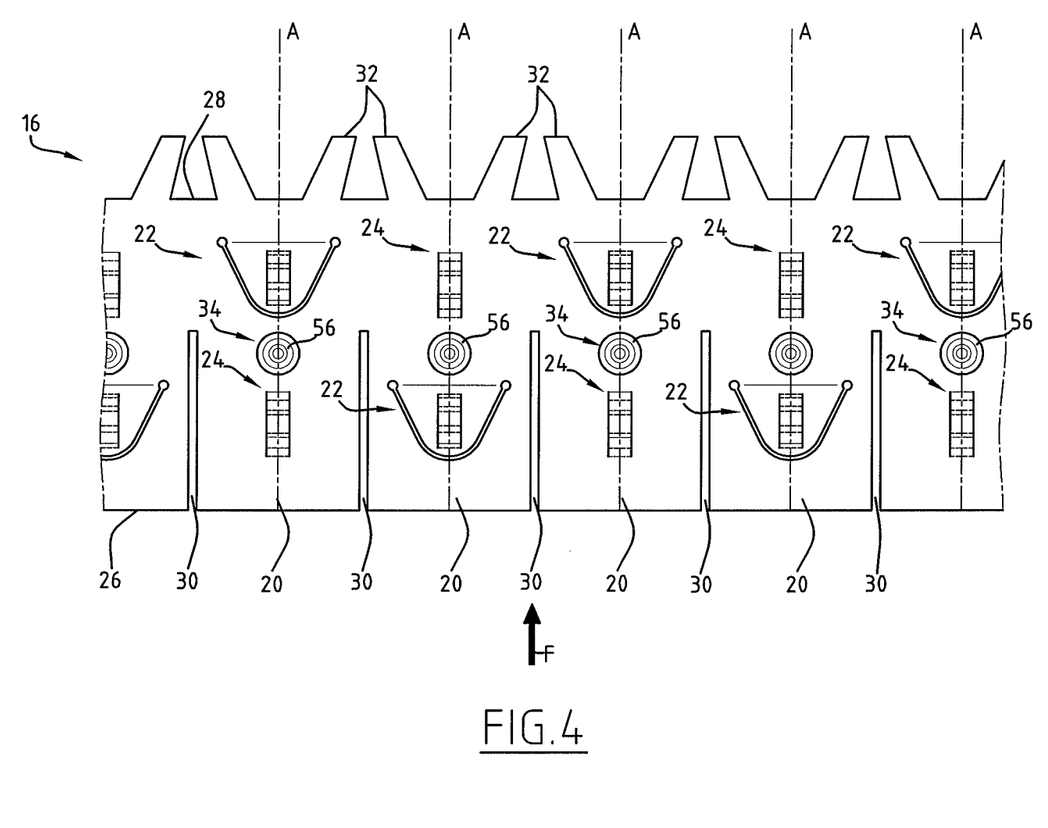
FIG. 4 is a partial front view of a strip of the spacer grid of FIG. 3.

FIG. 4 illustrates a plurality of the wall portions 20 of a strip 16, each of these wall portions 20 being adapted to delimit two cells 18, one on each side of the strip 16.

In operation, the coolant flows upwardly through each cell 18 in the flow direction F represented on FIG. 4 from an upstream lower edge 26 to a downstream upper edge 28 of the strip 16. The flow direction F is parallel to the cell axis A.

Each wall portion 20 extends from the lower edge 26 to the upper edge 28. The wall portions 20 are separated by slits 30 provided on the lower edge 26 and extending substantially to the half-height of the strip 16 for engagement with a series of corresponding slits 30 provided on the upper edge 28 and extending substantially to the half-height of an intersecting strip 16.

The strip 16 optionally comprises fins 32 protruding upwardly from the upper edge 28, each fin 32 being inclined relative to the cell axis A for imparting helical motion to the coolant fluid flowing through the cells 18 and enhancing heat exchange between the coolant and the fuel rods 4.

The strip 16 comprises on each of the illustrated wall portions 20 a spring 22, a dimple 24 and a motion limiter 34 each formed in the strip 16 and thus being integrally one-piece with the strip 16.

The spring 22 and the motion limiter 34 provided on each wall portion 20 protrude on the same face of the strip 16, whereas the dimple 24 protrudes on the opposite face of the strip 16.

The dimples 24 are alternately disposed below and above the springs 22 on the adjacent wall portions 20. Interlaced strips 16 thus can be arranged such that a spring 22 provided on a wall portion 20 of a strip 16 delimiting a cell 18 faces a dimple 24 provided on the opposite wall portion 20 of another strip 16 delimiting the cell 18.

The springs 22 of the strip 16 are identical and one spring 22 is further described with reference to FIGS. 5-7.

Figure 5:
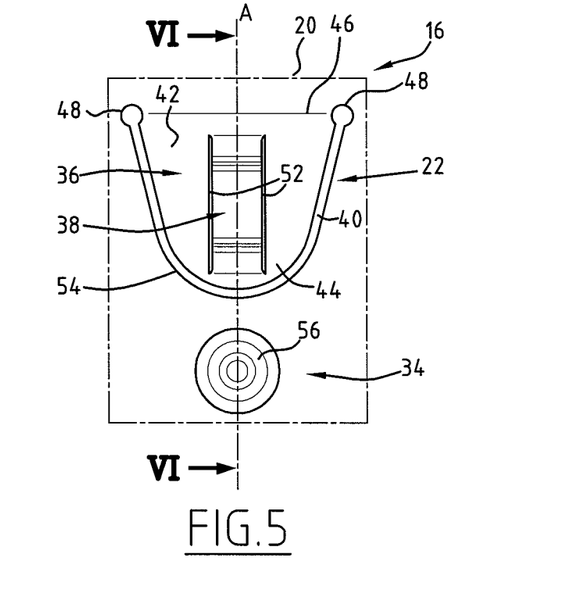
FIG. 5 is a front view of a spring and an associated motion limiter of the strip of FIG. 4.

The spring 22 illustrated on FIG. 5 comprises a flexible cantilevered tab 36 and a contact portion 38 cut out in the strip 16.

The tab 36 is delimited in the strip 16 by an elongated curved slot 40 of closed contour. The tab 36 is delimited between the slot 40 and the connection line 46 joining the opposed ends 48 of the slot 40. The ends 48 are preferably circular and enlarged to limit mechanical local peak stresses. The line 46 is perpendicular to the cell axis A. The tab 36 is connected to the wall portion 20 along the line 46.

The tab 36 extends downwardly in cantilevered fashion towards the upstream lower edge 26 and has an upper base 42 connected to the wall portion 20 and a lower free tip 44. The tab 36 is converging towards the free tip 44. The slot 40 is generally U-shape with diverging branches (or V-shape with a rounded tip).

In a free state of the spring 22, the tab 36 is inclined relative to the wall portion 20 and extends downwardly and away from the wall portion 20 towards the center of the cell 18 delimited by the wall portion 20. The tab 36 is elastically flexible by elastic deformation of the tab 36 with rotation of the tab 36 around a rotation axis substantially coinciding with the line 46. The flexibility of the tab can be adjusted by adjusting the diameter of the ends 48 of the slot 40.

The contact portion 38 is formed exclusively in the tab 36 and protrudes from the tab 36 opposite the wall portion 20 and towards the center of a cell 18 delimited by the wall portion 20. The contact portion 38 is integrally one-piece with the tab 36.

Figure 6:
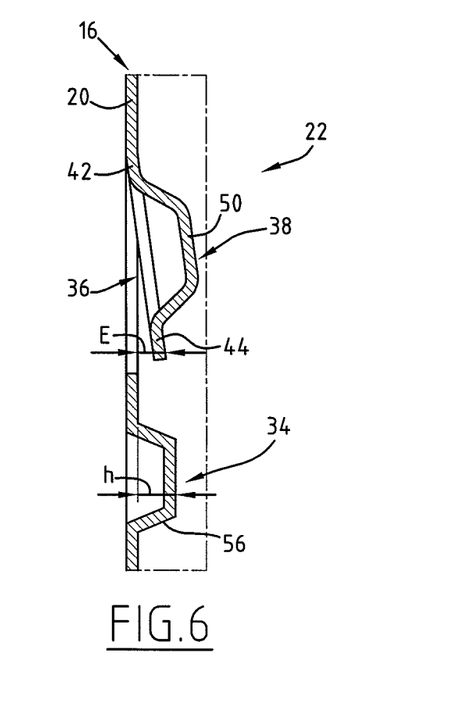
FIG. 6 is a sectional view of the spring and the motion limiter along VI-VI on FIG. 5.

According to the embodiment illustrated on FIGS. 4-6, the contact portion 38 is provided in the form of an arched bridge cut out in the tab 36. The contact portion 38 is elongated in the direction of the cell axis A, the two ends of the contact portion 38 connected to the tab 36 being aligned in the direction of the cell axis A. The contact portion 38 is formed as a lancing delimited between two openings 52 extending substantially parallel to each other in the direction of the cell axis A.

The motion limiter 34 associated to the spring 22 is formed in the strip 16 at a distance from the spring 22 and protrudes from the wall portion 20 on the same side than the corresponding spring 22. The motion limiter 34 is a bulge of curved perimeter formed in the strip 16, for instance of circular perimeter as illustrated on FIG. 5 with a risen portion 56 and an apex 62. The motion limiter 34 is disposed below or above the corresponding spring 22 (FIG. 3).

Figure 7:
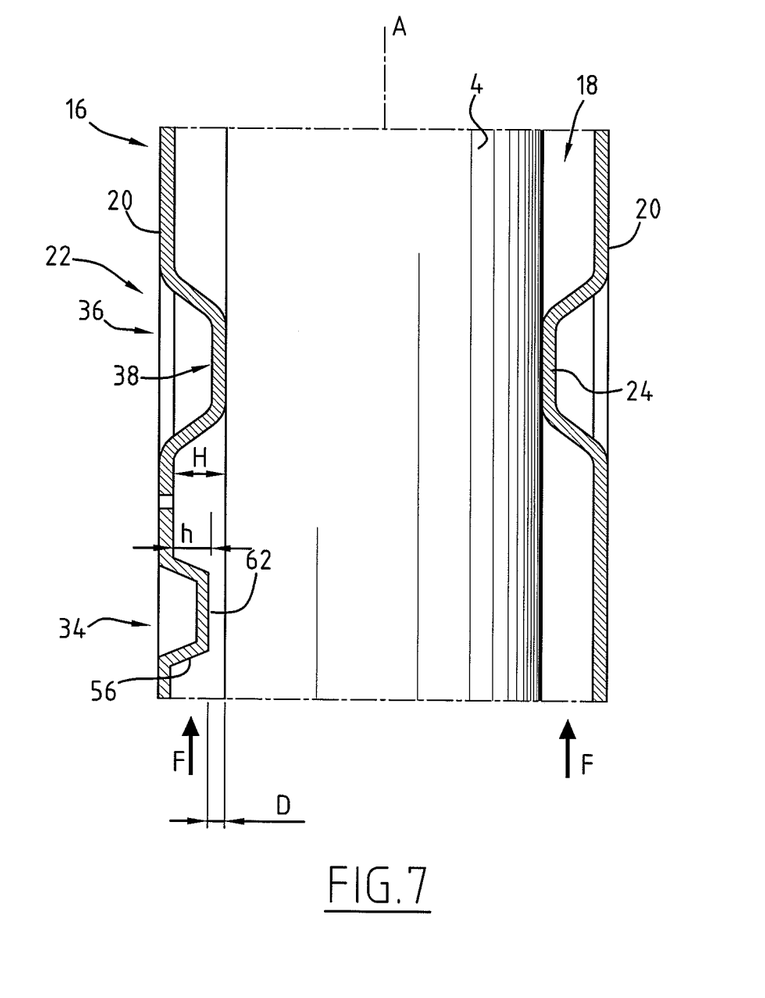
FIG. 7 is a partial sectional view of a cell of the spacer grid with a fuel rod extending through the cell.

As illustrated on FIG. 7, the contact portion 38 contacts the outer surface of a fuel rod 4 extending through a cell 18 delimited by the wall portion 20 with the tab 36 being elastically deformed towards the wall portion 20. The spring 22 thus biases the fuel rod 4 away from the wall portion 20 (toward the right on FIG. 7) in contact with a dimple 24 provided on the opposite wall portion 20 delimiting the cell 18.

In this configuration, the free tip 44 of the tab 36 extends substantially in the plane of the wall portion 20 and the height H of the contact portion 38 relative to the wall portion 20 is superior to the height h of the apex 62 of the motion limiter 34. There is a gap D between the apex 62 and the outer surface of the fuel rod 4.

In operation, the coolant flows through the cell 18 and around the fuel rod 4 upwardly at high speed in the flow direction F parallel to the cell axis A. This causes transverse vibration of the fuel rod 4 inside the cell 18. Transverse vibrations may also occur during transportation from manufacturing plant to power plant and during handling of the fuel assembly 2.

The motion limiter 34 is rigid and limits movements of a fuel rod 4 towards the wall portion 20 against the action of the spring 22. The motion limiter 34 thus avoids overstress of the spring 22 and namely plastic deformation thereof.

The spring 22 formed in the strip 16 with a flexible cantilevered tab 36 and a rigid contact portion 38 enables to bias the fuel rod 4 with an appropriate transverse force while limiting the flow resistance. The tab 36 furnishes the biasing force when the free tip 44 of the tab 36 is retracted in the plane (or nearly) of the wall portion 20; in this position only the contact portion 38 protrudes from the wall portion 20.

The contact portion 38 being elongated in the flow direction F enables to further limit the flow resistance and to provide an elongated contact zone with the fuel rod 4 for limiting fretting risks.

The spring 22 including the tab 36 and the contact portion 38 is obtainable in a single stamping operation easily and at low cost.

Figure 8:
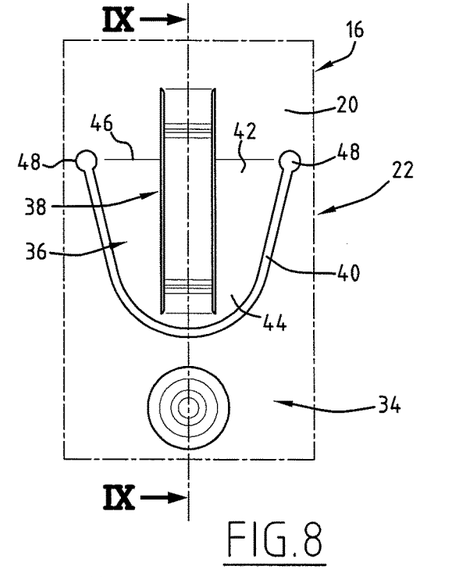
FIGS. 8 and 9 are views corresponding respectively to FIGS. 5 and 6 illustrating another embodiment of the invention.
Figure 9:
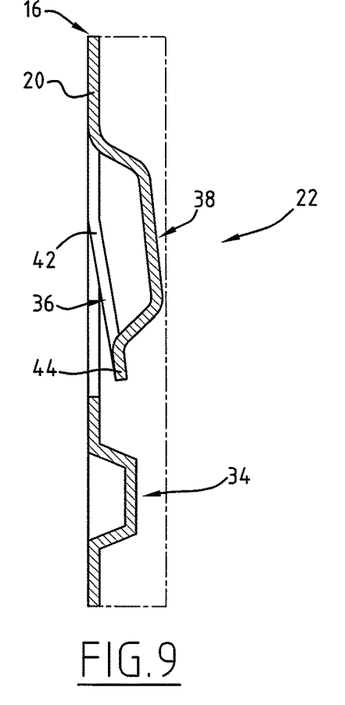

The alternative embodiment of FIGS. 8 and 9 differs from that of FIGS. 5 and 6 by the feature that the contact portion 38 is formed partially in the tab 36 and partially in the wall portion 20. The contact portion 38 is more elongated and steps over the line 46 joining the ends 48 of the slot 40 delimiting the tab 36.

This increases the stiffness of the spring 22 as biasing the spring 22 causes simultaneous deformation of the upper base 42 of the tab 36 and of the upper end of the contact portion 38 about two parallel but different axes.

Figure 10:
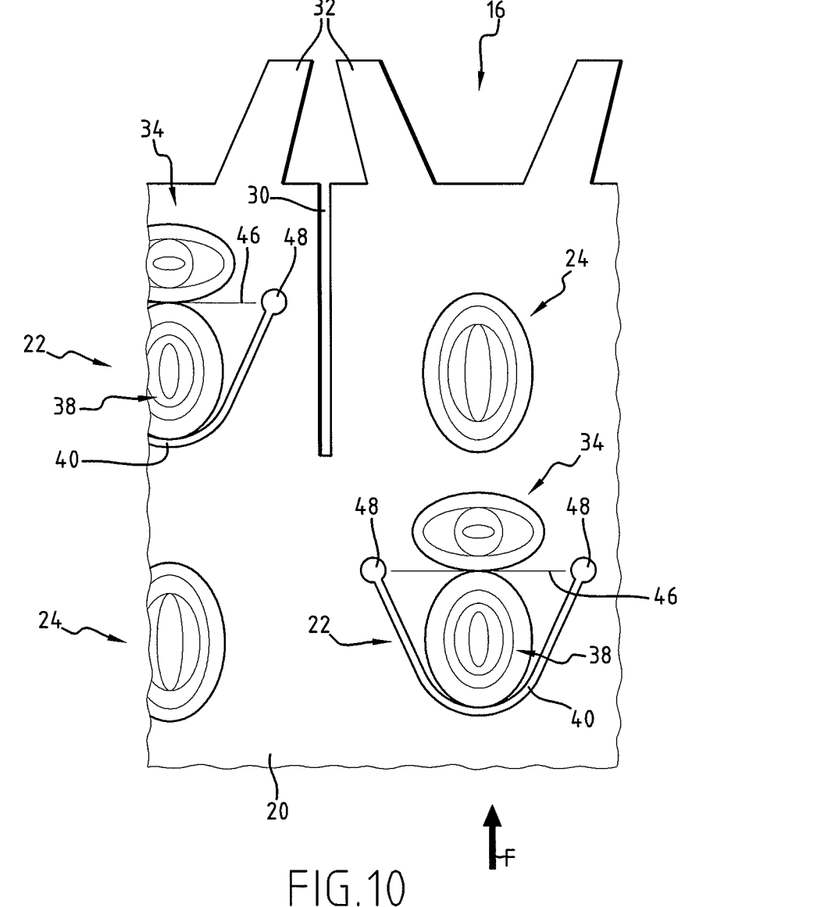
FIG. 10 is a front view of a strip illustrating another embodiment of the invention.

In the alternative embodiment of FIG. 10, the motion limiter 34 is a bulge having an elliptical perimeter. The motion limiter 34 is elongated transversely to the flow direction F. Each motion limiter 34 is located above the corresponding spring 22 in line with the spring 22 in the flow direction. Each motion limiter 34 is located adjacent the base of the spring tab 36. Preferably, the motion limiter 34 is tangent to the connection line 46.

The contact portion 38 is provided in the form of a closed bulge of curved perimeter. As illustrated on FIG. 10, the perimeter is advantageously an elliptical perimeter preferably elongated in the flow direction F.

The dimples 24 are also provided in the form of bulges of elliptical perimeter elongated in the flow direction.

In an alternative embodiment, the motion limiter 34 of FIG. 10 is combined with a spring 22 having a bridge-like contact portion 38 cut in the spring as in FIGS. 4-6. In another alternative embodiment, the motion limiter 34 of circular perimeter of FIGS. 4-6 is combined with the contact portion of FIG. 10 in the form of a closed bulge, namely of elliptical perimeter.

In the different embodiments, the motion limiter 34 and the spring 22 provided in line, one upstream the other in the flow direction F, reduce flow resistance of the strip 16.

The motion limiter 34 located above the spring 22 adjacent the connection line 46 stiffens the spring element 22 and lead to less local peak stresses at the ends 48 of the slot 40. These effects are even increased with the motion limiter 34 of elliptical perimeter of FIG. 10.

Figure 11:
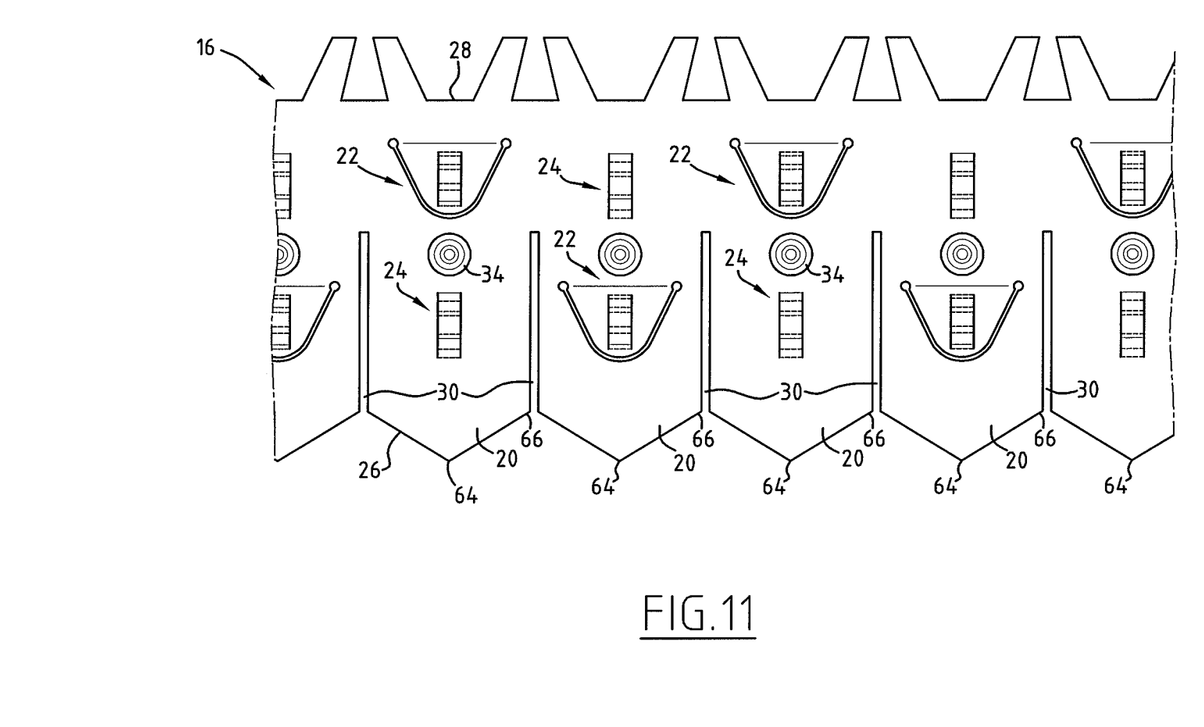
FIG. 11 is a front view of a strip of still another embodiment of the invention.

In the alternative embodiment of FIG. 11, the upstream lower edge 26 of the strip 16 is zigzag-shaped such that it is low at the center of each wall portion 20 and high at the junction between the wall portions 20 where interlaced strips 16 intersect each other.

As a result, a spacer grid 14 may be formed with interlaced strips 16 crossing at cross points 66 at a level higher than the lower points 64, whereby debris possibly present in the coolant fluid are guided transversely towards the cross points 66 at corners of the square shaped cells 18 where the space between the inner surface of the cells 18 and the fuel rods 4 is larger. The debris are thus prevented from damaging the fuel rods 4.

In an alternative embodiment, the lower edge 26 of the strip 16 is zigzag-shaped such that the upstream lower edge 26 is alternatively at a high level and at a low level at the junction between the wall portions 20.

As a result, the interlaced strips 16 may be assembled to provide cross points 66 at a high level and cross points 66 at a low level arranged in staggered rows, with the same benefit.

The lower edge 26 may present a wave shape instead of a zigzag shape.

The invention is applicable to spacer grids for a PWR (Pressurized Water Reactor) fuel assembly or to spacer grids for a BWR (Boiling Water Reactor) fuel assembly as illustrated and also to spacer grids for a VVER (Water-Water Energetic Reactor) fuel assembly.

What is claimed is:

1. A strip for a nuclear fuel assembly spacer grid comprising interlaced strips defining a lattice of cells for receiving fuel rods and allowing flow of a coolant in a flow direction, the strip comprising:
    a wall portion for delimiting a cell;
    a spring formed in the strip and provided on the wall portion for biasing the fuel rod extending through the cell away from the wall portion; and
    a rigid motion limiter formed in the strip on the wall portion to limit motion of the fuel rod received in the cell towards the wall portion against action of the spring, the spring comprising a cantilevered tab formed in the strip and a contact portion formed at least partially in the tab and protruding from the tab for contacting the fuel rod received in the cell, the tab being delimited in part by a connection line between the tab and the wall portion, the connection line extending perpendicular to the flow direction, the motion limiter being located in line with the spring in the flow direction, upstream or downstream the spring, the motion limiter and the spring protruding on the same face of the strip,
    wherein, in a configuration where a free tip of the tab extends substantially in the plane of the wall portion, the height of the contact portion relative to the wall portion is superior to the height of the apex of the motion limiter.

2. The strip according to claim 1, wherein in a free state of the spring, the tab is inclined relative to the wall portion.

3. The strip according to claim 1, wherein the contact portion is formed exclusively in the tab.

4. The strip according to claim 1, wherein the contact portion is formed in the tab and in the wall portion, the contact portion stepping over the connection line.

5. The strip according to claim 1, wherein the contact portion is in the form of an arched bridge.

6. The strip according to claim 5, wherein the contact portion has an end connected to the tab and an end connected to the wall portion.

7. The strip according to claim 1, wherein the contact portion is a bulge formed in the tab.

8. The strip according to claim 7, wherein the contact portion is of curved perimeter or elliptical perimeter.

9. The strip according to claim 1, wherein the contact portion is elongated in the flow direction.

10. The strip according to claim 1, wherein the tab extends downwardly in cantilevered fashion towards an upstream lower edge of the strip.

11. The strip according to claim 1, wherein the tab has an upper base connected to the wall portion and a lower free tip, the tab converging towards the free tip.

12. The strip according to claim 1, wherein the tab is delimited by an elongated curved slot and the connection line, the connection line joining the two opposite ends of the slot.

13. The strip according to claim 12, wherein the ends of the slots are circular and enlarged.

14. The strip according to claim 12, wherein the slot is U-shaped with branches diverging one from the other.

15. The strip according to claim 1, wherein the motion limiter is elongated in the flow direction or transverse to the flow direction.

16. The strip according to claim 1, wherein the motion limiter is a bulge of curved perimeter, circular perimeter or elliptical perimeter.

17. The strip according to claim 1, wherein the motion limiter is tangent to the connection line.

18. A spacer grid comprising:
    interlaced strips defining a lattice of cells for receiving fuel rods and allowing flow of a coolant axially upwardly through the spacer grid; and
    at least one interlaced strip as recited in claim 1.

19. A nuclear fuel assembly comprising:
    a bundle of fuel rods; and
    an armature for supporting the fuel rods, the armature comprising at least one of the spacer grid as recited in claim 18.

20. The strip according to claim 1 wherein the tab biases the fuel rod when the free tip of the tab is retracted substantially in the plane of the wall portion with the contact portion being the only portion of the spring protruding from the wall portion.

21. The strip according to claim 1 wherein the connection line forms a top end of the tab, the tab including a free tip forming a bottom end of the tab, the tab extending upward from the free tip in a first plane, the contact portion protruding from the first plane such a contact surface of the contact portion for contacting the fuel rod extends in a second plane, the second plane being offset with respect to the first plane such that the free tip is spaced away from the fuel rod when the contact surface contacts the fuel rod.

22. A strip for a nuclear fuel assembly spacer grid comprising interlaced strips defining a lattice of cells for receiving fuel rods and allowing flow of a coolant in a flow direction, the strip comprising:
    a wall portion for delimiting a cell;
    a spring formed in the strip and provided on the wall portion for biasing the fuel rod extending through the cell away from the wall portion; and
    a rigid motion limiter formed in the strip on the wall portion to limit motion of the fuel rod received in the cell towards the wall portion against action of the spring, the spring comprising a cantilevered tab formed in the strip and a contact portion formed at least partially in the tab and protruding from the tab for contacting the fuel rod received in the cell, the tab being delimited in part by a connection line between the tab and the wall portion, the connection line extending perpendicular to the flow direction, the motion limiter being located in line with the spring in the flow direction, upstream or downstream the spring, the motion limiter and the spring protruding on the same face of the strip such that after a bottom edge of the tab is forced past a plane of the wall portion by the fuel rod the motion limiter contacts the fuel rod, the top edge of the tab remaining in the plane of the wall portion as the bottom edge of the tab is forced past the plane of the wall portion by the fuel rod.

23. The strip according to claim 22 wherein the tab is converging from the connection line towards a free tip of the tab, the contact portion extending away from the free tip toward the connection line to elongate in the flow direction.

24. The strip according to claim 22 wherein the tab extends in a plane, the contact portion connecting with a lower end of the tab at the plane at a lower end of the contact portion.

25. The strip according to claim 24 wherein the contact portion connects with an upper end of the tab at the plane at an upper end of the contact portion.

26. A strip for a nuclear fuel assembly spacer grid comprising interlaced strips defining a lattice of cells for receiving fuel rods and allowing flow of a coolant in a flow direction, the strip comprising:
   a wall portion for delimiting a cell;
   a spring formed in the strip and provided on the wall portion for biasing the fuel rod extending through the cell away from the wall portion; and
   a rigid motion limiter formed in the strip on the wall portion to limit motion of the fuel rod received in the cell towards the wall portion against action of the spring, the spring comprising a cantilevered tab formed in the strip and a contact portion formed at least partially in the tab and protruding from the tab for contacting the fuel rod received in the cell, the tab being delimited in part by a connection line that connects the tab to the wall portion, the connection line extending perpendicular to the flow direction, the motion limiter being located in line with the spring in the flow direction, upstream or downstream the spring, the motion limiter and the spring protruding on the same face of the strip, the tab extending in a plane from the connection line, the contact portion being at least partially cut out in the tab as an arched bridge protruding from the plane of the tab or being an elliptically shaped bulge protruding from the plane of the tab.

27. The strip according to claim 26 wherein the contact portion is formed as a lancing delimited between two openings extending substantially parallel to each other in a direction of an axis of the fuel rod.

28. The strip according to claim 26 wherein the contact portion is formed partially in the tab and partially in the wall portion such that the contact portion steps over the connection line.

29. A strip for a nuclear fuel assembly spacer grid comprising interlaced strips defining a lattice of cells for receiving fuel rods and allowing flow of a coolant in a flow direction, the strip comprising:
   a wall portion for delimiting a cell;
   a spring formed in the strip and provided on the wall portion for biasing the fuel rod extending through the cell away from the wall portion; and
   a rigid motion limiter formed in the strip on the wall portion to limit motion of the fuel rod received in the cell towards the wall portion against action of the spring, the spring comprising a cantilevered tab formed in the strip and a contact portion formed at least partially in the tab and protruding from the tab for contacting the fuel rod received in the cell, the tab being delimited in part by a connection line between the tab and the wall portion, the connection line extending perpendicular to the flow direction, the motion limiter being located in line with the spring in the flow direction, upstream or downstream the spring, the motion limiter and the spring protruding on the same face of the strip,
   wherein the tab is delimited by an elongated curved slot and the connection line, the connection line joining the two opposite ends of the slot, the slot being defined by a curved edge of the tab and a curved edge of the strip, the curved edge of the tab delimiting a free end of the tab,
   wherein the curved edge of the tab and the curved edge of the strip have a similar shape.

\* \* \* \* \*